United States Patent
Goodermuth et al.

(10) Patent No.: US 9,475,391 B2
(45) Date of Patent: **\*Oct. 25, 2016**

(54) METHOD AND SYSTEM FOR VEHICLE POWER DISTRIBUTION AND MANAGEMENT

(71) Applicant: General Electric Company, Schenectady, NY (US)

(72) Inventors: Todd William Goodermuth, Melbourne, FL (US); Wolfgang Daum, Greenfield, WI (US); Mark Kraeling, Melbourne, FL (US); Jared Klineman Cooper, Palm Bay, FL (US); Ning Zhang, Melbourne, FL (US)

(73) Assignee: General Electric Company, Schenectady, NY (US)

(*) Notice: Subject to any disclaimer, the term of this patent is extended or adjusted under 35 U.S.C. 154(b) by 836 days.

This patent is subject to a terminal disclaimer.

(21) Appl. No.: 13/893,135

(22) Filed: May 13, 2013

(65) Prior Publication Data
US 2013/0249280 A1 Sep. 26, 2013

Related U.S. Application Data

(63) Continuation-in-part of application No. 12/840,345, filed on Jul. 21, 2010, now Pat. No. 8,441,143.

(51) Int. Cl.
*B60L 1/00* (2006.01)
*B60L 11/02* (2006.01)
*B60L 11/12* (2006.01)
*B60L 15/20* (2006.01)

(52) U.S. Cl.
CPC .................. *B60L 1/00* (2013.01); *B60L 11/02* (2013.01); *B60L 11/12* (2013.01); *B60L 15/2045* (2013.01); *B60L 15/2072* (2013.01); *B60L 15/20* (2013.01); *B60L 2200/26* (2013.01); *Y02T 10/7005* (2013.01); *Y02T 10/72* (2013.01); *Y02T 10/7283* (2013.01)

(58) Field of Classification Search
CPC ........................................................ B60L 1/00
USPC ........................................................ 307/9.1
See application file for complete search history.

(56) References Cited

U.S. PATENT DOCUMENTS

| | | |
|---|---|---|
| 5,073,686 A | 12/1991 | Gabriel |
| 6,366,951 B1 | 4/2002 | Schmidt |
| 7,420,293 B2 | 9/2008 | Donnelly et al. |
| 7,593,963 B2 | 9/2009 | Ballesty et al. |
| 7,761,198 B2 | 7/2010 | Bhardwaj |
| 8,441,143 B2 * | 5/2013 | Goodermuth ........... B60L 11/02 307/34 |

\* cited by examiner

*Primary Examiner* — Robert Deberadinis
(74) *Attorney, Agent, or Firm* — GE Global Patent Operation

(57) ABSTRACT

A rail vehicle system and a method for managing distribution of power in the rail vehicle system are provided.

20 Claims, 10 Drawing Sheets

METHOD AND SYSTEM FOR VEHICLE POWER DISTRIBUTION AND MANAGEMENT

CROSS REFERENCE TO RELATED APPLICATIONS

This application is a continuation-in-part of U.S. patent application Ser. No. 12/840,345, filed Jul. 21, 2010 and entitled METHOD AND SYSTEM FOR RAIL VEHICLE POWER DISTRIBUTION AND MANAGEMENT, the entirety of which is hereby incorporated by reference for all purposes.

FIELD

The subject matter disclosed herein relates to managing distribution of power in a locomotive or other vehicle.

BACKGROUND

When a locomotive or other vehicle is not in transit, such as at a station, the vehicle may be placed in a standby condition where an internal combustion engine of the vehicle is shut-off. By shutting off the engine, combustion does not occur. As such, fuel is preserved and emissions may be reduced and applications and/or appliances that remain active during the standby condition are powered by an energy storage device, such as a battery.

BRIEF DESCRIPTION

Methods and systems are provided for managing distribution of power in a locomotive or other vehicle. In one embodiment, a vehicle system is provided. Embodiments are provided that illustrate the inventive system in conjunction with a locomotive for use in the rail industry, however other vehicles may be used. The vehicle system comprises a power source to generate electrical power, a battery to store electrical power that is generated by the power source, and a switch that is connected between the power source and the battery. The knife switch is actuatable to disconnect the battery from the power source. The vehicle system further comprises a power management system that is connected on either side of the switch. The power management system manages selective distribution of power to a plurality of electronic applications and/or appliances based on a rule set.

During the standby condition when no power is being generated by the engine, the applications and/or appliances that generate a power load on the battery can be shut-off in a coordinated and orderly manner to prevent battery dissipation. The power management system shut off applications and/or appliances that are connected on the battery-side of the switch, because these applications and/or appliances, if left on, generate a power load on the battery even when the switch is open that results in battery dissipation. However, it may also be used on the upstream (non-battery) side of switch. In this way, a state of charge of the battery can be preserved for various rail vehicle system operations, such as engine starting. Moreover, by systematically shutting-off power to targeted applications and/or appliances during the standby condition, the applications and/or appliances are able to be suitably shut down prior to power loss. In this way, data loss and/or corruption can be inhibited.

DETAILED DESCRIPTION

The description relates to locomotives or other vehicles that include integrated systems for managing power distribution to various locomotive or other vehicle electronic applications and/or appliances. Embodiments described herein may provide the ability to selectively shut-off applications and/or appliances in a predefined manner to shed power load.

In one example, the power distribution management systems perform power load shedding operations during standby conditions where an engine is shut-off by targeting applications and/or appliances connected on a battery-side of the switch that generate a power load on the battery that causes a state of charge of the battery to decrease. The power load shedding operations may be performed in order to preserve battery power. The power distribution management systems allow for applications and/or appliances on the battery-side of the switch to remain on even after the engine is shut-off to provide various functions, and upon battery dissipation the applications and/or appliances are shut-off in a targeted and orderly manner to preserve the state of charge of the battery at a suitable level for performing system operations, such as engine starting.

One example of such a configuration is illustrated with reference to FIG. 1. A power management system manages selective distribution of power to a plurality of applications and/or appliances that are connected on the battery-side of a knife switch. The power management system selectively shuts off the applications and/or appliances based on a rule set that governs operational priorities of the locomotive.

Figure 2:
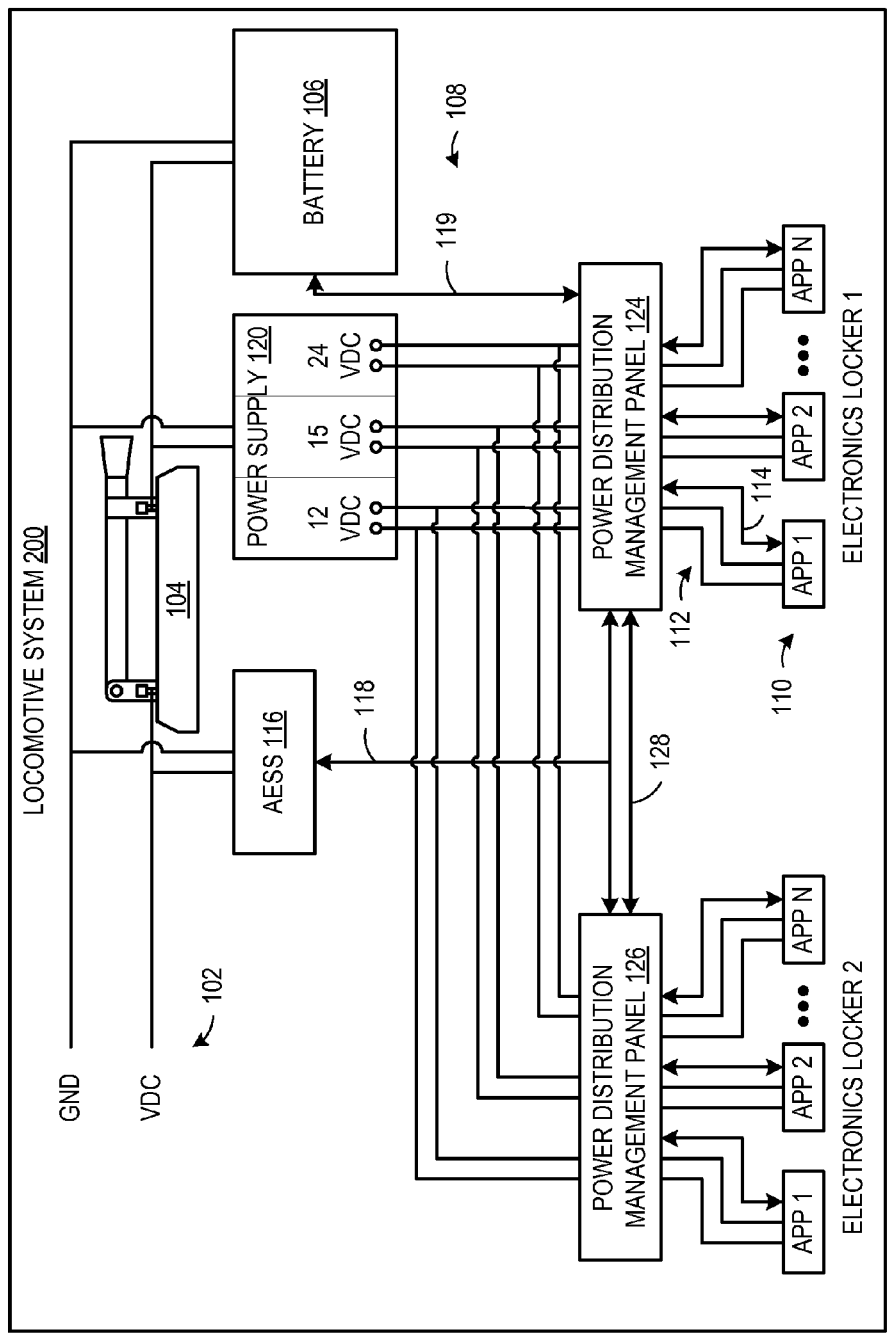
FIG. 2 schematically shows an example embodiment of a rail vehicle system including a plurality of power distribution management panels.

Furthermore, as elaborated in FIG. 2, in some embodiments, a plurality of power distribution management panels that may be distributed throughout the system communicate with each other to coordinate power load shedding operations or to selectively distribute power to applications and/or appliances connected on the battery-side of the switch.

Figure 3:
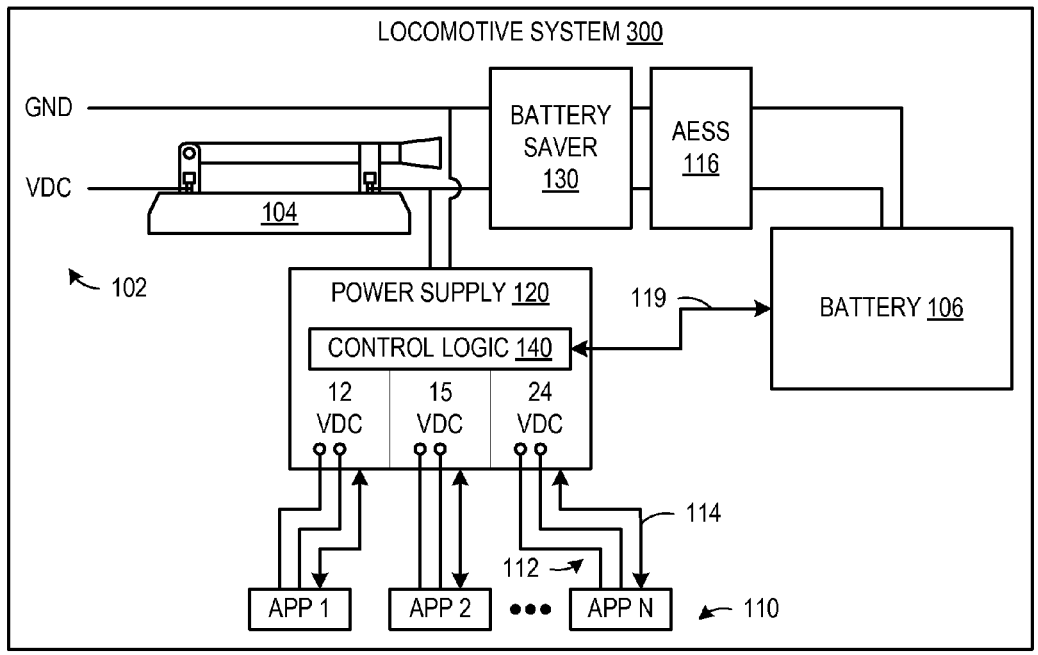
FIG. 3 schematically shows an example embodiment of a rail vehicle system including a modular power supply for selectively distributing power at a plurality of different voltage levels.

Alternatively, as shown in FIG. 3, a modular power supply, connected on the battery-side of the switch, includes control logic to selectively distribute power at a plurality of different voltage levels to different applications and/or appliances connected on the battery-side of the knife switch. In other words, different applications and/or appliances selectively receive power from the different power modules of the modular power supply at the different voltage levels. In such a configuration, power load shedding is performed at a per voltage level basis based on a rule set by selectively shutting off power to one or more of the power modules at the different voltage levels and correspondingly shutting off the applications and/or appliances receiving power from the power module at that voltage level.

Figure 4:
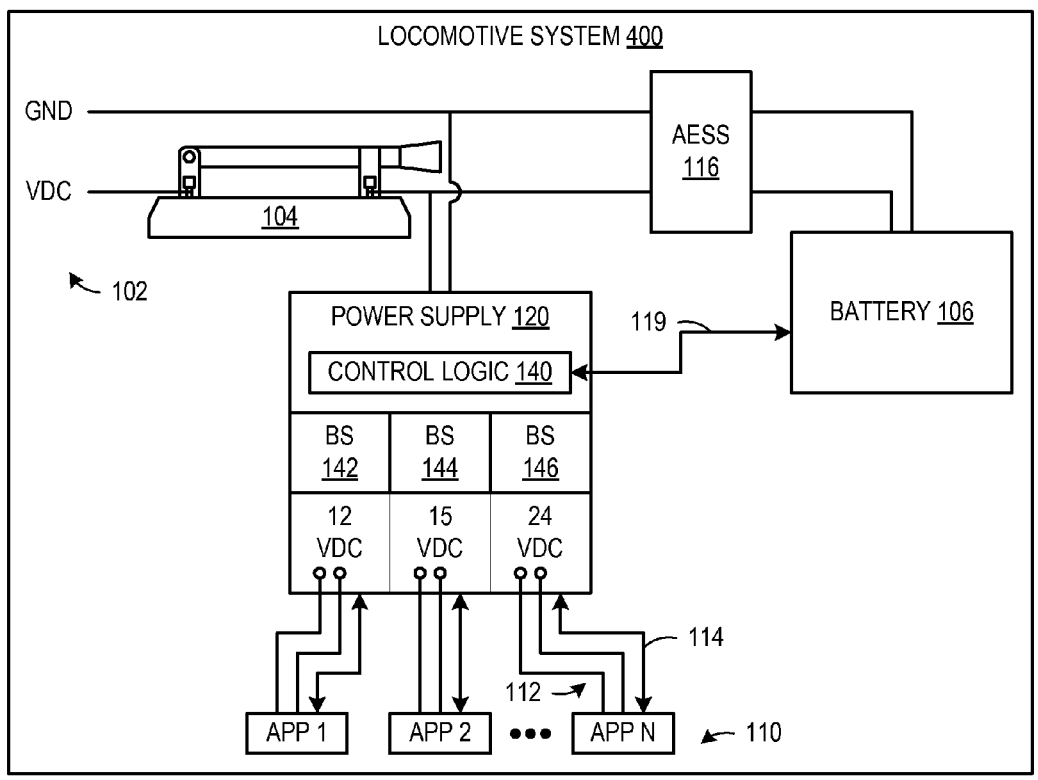
FIG. 4 schematically shows an example embodiment of a rail vehicle system including a modular power supply having a plurality of integrated battery saving devices corresponding to each voltage level.

Furthermore, as elaborated in FIG. 4, a battery saving device is integrated into each of the power modules of the modular power supply to selectively extend the operating time of the applications and/or appliances receiving power from the different power modules before load shedding is performed.

Accordingly, by providing such power distribution management and power load shedding capabilities, applications and/or appliances connected on the battery-side of the knife switch may remain on to perform various operations (e.g., communication and monitoring) even when the engine is shut-off without draining the battery. Also, applications and/or appliances are selected for shut-off in a targeted fashion according to a rule set tailored to customer wants. The selected applications and/or appliances are notified of impending power loss so the selected applications and/or appliances can shut down prior to power loss in order to prevent data loss and/or corruption. Further, vehicles may achieve increased fuel efficiency and reduced emissions since the engine does not have to be started as frequently. Further still, consistent engine startup is achieved since battery state of charge is preserved. Moreover, all of these benefits combine to provide an overall reduction in operation costs.

Figure 1:
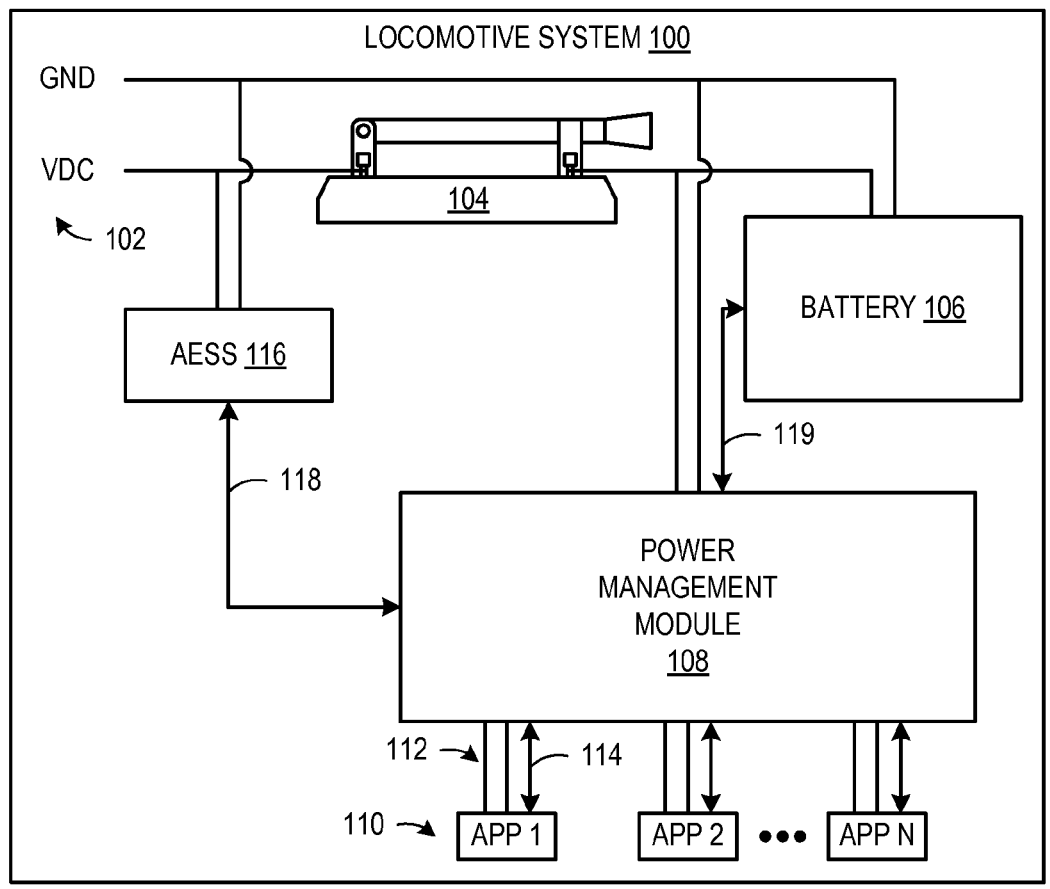
FIG. 1 schematically shows an example embodiment of a rail vehicle system including a power management system for managing distribution of power.

FIG. 1 is a block diagram of an example embodiment of a rail vehicle system 100 that is configured to run on a track. In one example, the vehicle is a diesel-electric locomotive that operates a diesel engine (not shown). Other suitable vehicles may include automotive vehicles, mining equipment, off highway vehicles, on highway vehicles, marine vessels, and the like. In alternative embodiments of the vehicle system, alternate engine configurations may be employed, such as a gasoline engine or a biodiesel or natural gas engine, or a hybrid of the foregoing, for example. The engine is may generate torque that is transmitted to an alternator (not shown). The generated torque is used by the alternator to generate electricity for subsequent propagation to the vehicle. The vehicle engine may be run at a constant speed, thereby generating a constant horsepower output, or at variable speeds generating variable horse power output, based on operational demand. The electrical power generated in this manner may be referred to as the prime mover power generated from a power source 102. Based on the nature of the generated electrical output, the electrical power may be distributed as direct current (as depicted) or as alternating current.

The power source 102 provides power, to a variety of downstream electrical components of the vehicle system. The power may be provided, for example, at step 74 volts direct current (VDC) if the vehicle is a locomotive, but the electrical power may be provided at a voltage level suitable for the vehicle and the application. As another example, electrical power may be provided at 110 VDC. A battery 106 may be connected downstream of the power source 102. During engine operation, 74 VDC may be provided by the power source 102 to the battery 106 to increase a state of charge of the battery 106, under some conditions. A switch 104, such as a knife switch, may be connected in-line between the power source and the battery. The switch may be selectively actuatable to connect/disconnect the power source to the battery. More particularly, as discussed above, the vehicle system may be placed in a standby condition where the engine may be shut-off. For example, the vehicle system may be placed in the standby condition to reduce fuel consumption, such as when a locomotive or other vehicle resides in a station. As another example, the vehicle system may be placed in a standby condition due to engine fault or degradation that causes dissipation of the battery. During the standby condition, an operator may open the switch to disconnect the battery from the power source in order to reduce or prevent undesired engine starting.

An automatic engine start stop (AESS) system 116 may be positioned between the power source and the switch. The AESS system may be operable to enable the engine of the power source to be automatically started and stopped. The AESS system commands the engine to automatically start and stop upon fulfillment of AESS criteria. The AESS system monitors locomotive (or other vehicle) operating parameters. Upon verifying that AESS criteria are met, the AESS system sends commands to the gamut of engine control hardware components such as invertors, relays, alternator, fuel pumps, etc. to start the engine. In one example, AESS criteria dictates starting the engine in response to a state of charge of the battery dropping below a threshold and stopping the engine when the battery is suitably charged. As another example, AESS criteria dictate starting the engine in response to a temperature of the engine dropping below a threshold. As another example, AESS criteria dictates starting/stopping the engine at predefined times or intervals. As another example, AESS criteria dictate starting/stopping the engine as commanded by an operator.

The engine may be started with a suitable engine starting system. In one example, a generator start may be performed wherein the electrical energy produced by a generator or alternator may be used to start the engine. Alternatively, the engine starting system may comprise a motor, such as an electric starter motor, or a compressed air motor, for example. The engine may be started using energy in a battery system, or other appropriate energy sources.

A power management system 108 may be connected between the switch and the battery. The power management system manages distribution of power to a plurality of locomotive or other vehicle electronic applications and/or appliances that are connected to the power management system on the battery-side of the switch by power connectors 112. In particular, the power management system receives 74 VDC from a battery-side of the locomotive or other vehicle switch and converts the native voltage to a plurality of different voltage levels (e.g., 12 VDC, 15 VDC, and 24 VDC) that are suitable for powering the plurality of applications and/or appliances. Examples of the applications and/or appliances that connect to and receive power from the power management system include train management computers (TMC), radio communication devices, event recorders (ER), end of train sensors (EOT), positive train control (PTC) monitoring applications, dynamic brake monitoring (DBM) applications, locomotive or other vehicle interface gateway (LIG) applications, etc.

Since the applications and/or appliances are connected on the battery-side of the switch, the applications and/or appliances can remain on even when the engine is shut-off and be powered by the battery. Since the power management system provides managed power at specific voltage levels to each of the applications and/or appliances, individual power supplies corresponding to each of the applications and/or appliances can be eliminated. Accordingly, the power management system facilitates a reduction in individual power management components and wiring. In this way, the rail vehicle system is made less complex and production/maintenance costs are reduced.

In some embodiments, the power management system may be connected on the power source side of the switch to manage distribution of power to applications and/or appliances connected between the power source and the switch. Accordingly, the power management system may be connected on either side of the switch to manage distribution of power to application and/or appliances of the vehicle system.

Furthermore, the power management system communicates with various components of the vehicle system to monitor operating conditions and/or send commands in order to provide power load shedding capabilities. The power management module communicates with the battery through battery communication line 119 to receive operating state information including battery power parameters. The power management system communicates with the plurality of applications and/or appliances through application and/or appliance communication lines 114 to receive operating state information including power usage parameters from each of the plurality of applications and/or appliances. The power management system communicates with the AESS system through AESS communication line 118 to receive operating state information including AESS monitored parameters, AESS criteria, and/or AESS commands.

When the switch is closed and the engine is operating, the power management system receives 74 VDC from the power source to distribute to the plurality of applications and/or appliances. When the switch opens, the power management system receives power from the battery. When the locomotive or other vehicle is in the standby condition, some of the plurality of applications and/or appliances remain on to provide communication, monitoring, and other suitable capabilities. As such, the selected applications and/or appliances that remain on generate a power load that dissipates the battery.

The power management system determines the state of charge of the battery based on the information received from the battery. The power management system determines the power load based on the information received from the plurality of applications and/or appliances. The power management system determines operating conditions and/or AESS commands based on information received from the AESS system. Based on the aggregate information received from the various components, the power management system shuts off selected applications and/or appliances in a suitable manner according to a rule set to shed power load in order to preserve the state of charge of the battery. In particular, the power management system sends notifications of imminent power loss to the selected applications and/or appliances a suitable duration before power is shut-off so that the selected applications and/or appliances are able to shut themselves down in order to prevent data loss and/or corruption. As an example, the notifications are sent as class C/D messages as specified in the PTC communications architecture.

Furthermore, in some cases the rule set defines a load shedding priority where some applications and/or appliances are shut-off before other applications and/or appliances. As an example, the load shedding priority dictates that locomotive or other vehicle lights are shut-off prior to communication and/or monitoring applications and/or appliances. As another example, the load shedding priority dictates that an application and/or appliance that has a greater power load is shut-off prior to an application and/or appliance that has a lesser power load. As yet another example, applications and/or appliances located in one area of the vehicle system are shut-off prior to applications and/or appliances in another area of the vehicle system.

In some embodiments, the rule set may be predefined so that an application and/or appliance shutdown priority may be static. The priority can be set to accommodate needs and/or wants specific to a customer. In some embodiments, the rule set may be dynamic so as to adjust an application and/or appliance shutdown priority based on operating conditions. For example, the rule set may adjust priority depending on the device shut down, such as its health, state of data transmission, other state of operation and the like. In one particular example, if a router has data that has to be transmitted, the rule set may dynamically change to sequence the shut-off of other data sources to allow the router to transmit the information through a transmitter. After transmission, the router and the transceiver are sequenced for shut-off. Further, the rule set may accommodate for determining the criticality of the data being transmitted by the router and if it is determined that that data does not need to be transmitted immediately, the data may be stored in non-volatile memory for retransmission when the router comes back up again and the router may be commanded to shut itself off prior to impending power shut-off.

Since the power management system communicates with the AESS system, the power management system coordinates load shedding operations and/or overrides AESS commanded starting/stopping of the engine according to the rule set. As an example, the power management system knows that the engine is to be started at a predetermined time in the near future and overrides an AESS commanded engine start and instead sheds power load to inhibit battery dissipation until the engine is started at the predetermined time.

Note the power management system coordinates load shedding with a suitable integrated system/device of the rail vehicle system. For example, the power management system communicates and coordinates with a locomotive or other vehicle computing system and other devices that perform similar power management functions that are integrated into the vehicle system. Further, the power management system can override operations of such a system/device to perform power load shedding.

Accordingly, the power management system provides consistent vehicle-wide power management and distribution as well as load shedding capabilities in an integrated manner. This inhibits unnecessary engine operation, inhibits battery dissipation events, allows for suitable shut-off of applications and/or appliances to inhibit data loss and/or corruption, and allows selected applications and/or appliances to stay on as long as possible to provide communication, monitoring, etc. capabilities as long as possible during a standby condition. In this way, fuel may be preserved, the locomotive or other vehicle engine is suitably started, and operating cost may be reduced.

FIG. 2 is a block diagram of an example embodiment of a vehicle system 200 where the power management system includes a modular power supply that provides power to a plurality of power distribution management panels that each control a plurality of applications and/or appliances that are distributed throughout the vehicle system. Components of the vehicle system 200 that may be substantially the same as those in vehicle system 100 shown in FIG. 1 and described above are identified in the same way and are described no further. However, it will be noted that components identified in the same way in different embodiments of the present disclosure may be at least partly different.

In the illustrated embodiment, the power management system includes a modular power supply 120 that receives 74 VDC from the battery-side of the locomotive or other vehicle switch and converts the native voltage to a plurality of different voltage levels (e.g., 12 VDC, 15 VDC, and 24 VDC) that are controlled separately at different outputs. The modular power supply provides mounting and cost flexibility relative to device specific power supplies. Moreover, the modular power supply provides increased heat dissipation benefits relative to separate power supplies.

The modular power supply supplies power at the different voltage levels to a plurality of power distribution and management panels (PDMP), namely a first PDMP 124 and a second PDMP 126. The PDMPs receive the plurality of voltages and provide a way for electronic applications and/or appliances to attach to the PDMPs to receive power at the different voltage levels. By providing a plurality of PDMPs, various applications and/or appliances operating at different voltage levels that are distributed throughout the vehicle system can receive managed power locally. For example, the first PDMP can be positioned in an electronics locker located in an alcove of the locomotive or other vehicle to provide managed power to applications and/or appliances local to the locomotive or other vehicle. Further, the second PDMP can be positioned in an electronics locker located near a traction motor to provide managed power to application and/or appliances local to the traction motor. Note a PDMP may be located in a suitable location in the rail vehicle system. In this way, device specific power supplies can be reduced or eliminated and the amount of wiring to supply power to the applications and/or appliances can be reduced.

The first PDMP and the second PDMP communicate with each other through PDMP communication line 128. The PDMPs provide operating state and power load information of applications and/or appliances connected to each of the PDMPs to each other in order to provide coordinated load shedding capabilities. In particular, one or more of the PDMPs can determine the total power load of the applications and/or appliances connected to all of the PDMPs to shut-off selected applications and/or appliances according to a rule set in order to shed power load for battery preservation. Fore example, the rules set may dictate that applications and/or appliances connected to the second PDMP are shut-off prior to applications and/or appliances connected to the first PDMP. Accordingly, when load shedding may be performed, the first PDMP and the second PDMP communicate to coordinate shut-off of applications and/or appliances connected to the second PDMP.

The PDMPs provide notifications of impending shutdown events to applications and/or appliances in order to allow the applications and/or appliances to orderly shut themselves down. As an example, the notifications are sent as class C/D messages as specified in the PTC communications architecture. The coordinated power load shedding capabilities allow for more efficient power load shedding than otherwise would be possible without communication between the PDMPs.

Additionally (or optionally), the first PDMP and the second PDMP communicate with the AESS system through the AESS communication line. In this way, power load shedding may be coordinated between the AESS system and the first PDMP and the second PDMP. The coordination between the PDMPs and the AESS system provide integrated, predefined, configurable load shedding to maintain suitable battery performance.

In some embodiments, one or more PDMPs can be virtual, that is, the PDMPs can be logical representations executable on a computing device. In some embodiments, the PDMPs can be a combination of hardware, firmware, and/or software for managing distribution of power to applications and/or appliances of the vehicle system.

FIG. 3 is a block diagram of an example embodiment of a vehicle system 300 where the power management system includes a modular power supply that includes control logic that provides management to different voltage level output of the modular power supply. In particular, the control logic shuts-off the different outputs separately to provide power load shedding capabilities according to power load at a selected voltage level as opposed to device specific power load shedding.

The power management system includes a modular power supply that receives 74 VDC from the battery-side of the locomotive or other vehicle switch and converts the native voltage to a plurality of different voltage levels (e.g., 12 VDC, 15 VDC, and 24 VDC) that are controlled separately at different outlets. The modular power supply includes control logic 140 to provide voltage level specific power load shedding capabilities. The control logic performs power load shedding by shutting off power to selected voltage level outputs according to a rule set based on received parameters, operating state information, and power load. For example, the control logic shuts off all applications and/or appliances connected to the 12VDC output according to the rule set in order to shed power load.

In the illustrated embodiment, a battery saving device 130 is positioned between the switch and the battery on the battery-side of the modular power supply. In some embodiments, the battery saving device includes a motor (e.g., a diesel engine) that is selectively operable to provide additional power. The power saving device is operable during standby conditions to delay power load shedding operations so that applications and/or appliances remain on longer. It will be appreciated that a battery saving device may include a suitable device that can be turned on or shut-off to preserve battery state of charge. Furthermore, the AESS system is positioned between the switch and the battery on the battery-side of the battery saving device. The battery saving device and the AESS system are positioned on the battery-side of the switch in order to coordinate battery preserving operation with the modular control logic of the power supply. The modular power supply with control logic provides some load shedding capability as a lower cost alternative to PDMPs. Moreover, the modular power supply can be installed in existing vehicle systems that do not include PDMPs to provide integrated management of power distribution and power load shedding capabilities that would otherwise not occur on existing vehicle systems.

FIG. 4 is a block diagram of an example embodiment of a vehicle system 400 where the power management system includes a modular power supply that incorporates battery saving functionality into the modular power supply. In particular, a plurality of battery saving devices each corresponds to a different voltage level output of the modular power supply. A first battery saving device 142 corresponds to a first voltage level output (e.g., 12 VDC). A second battery saving device 144 corresponds to a second voltage level output (e.g., 15 VDC). A third battery saving device 146 corresponds to a third voltage level output (e.g., 24 VDC). The control logic selectively commands operation of one or more of the battery saving devices to provide additional power to prolong operation of the applications and/or appliances connected to the voltage level output that corresponds to the battery saving device. For example, battery saving device 142 may be turned on to provide additional power to applications and/or appliances connected to the 12 VDC output of the modular power supply. By incorporating the battery saving functionality into each voltage level module of the power supply, variably levels of selective load shedding can be performed with a simpler architecture and at a lower cost relative to configurations that include one or more PDMPs.

The configurations illustrated above enable various methods for managing distribution of power to electronic applications and/or appliances in a vehicle system. Accordingly, some such methods are now described, by way of example, with continued reference to above configurations. These methods, and others within the scope of the disclosure, may be enabled via other configurations as well. These methods may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but may be provided for ease of illustration and description. One or more of the illustrated actions, functions, or operations may be performed repeatedly, depending on the particular strategy being used.

Figure 5:
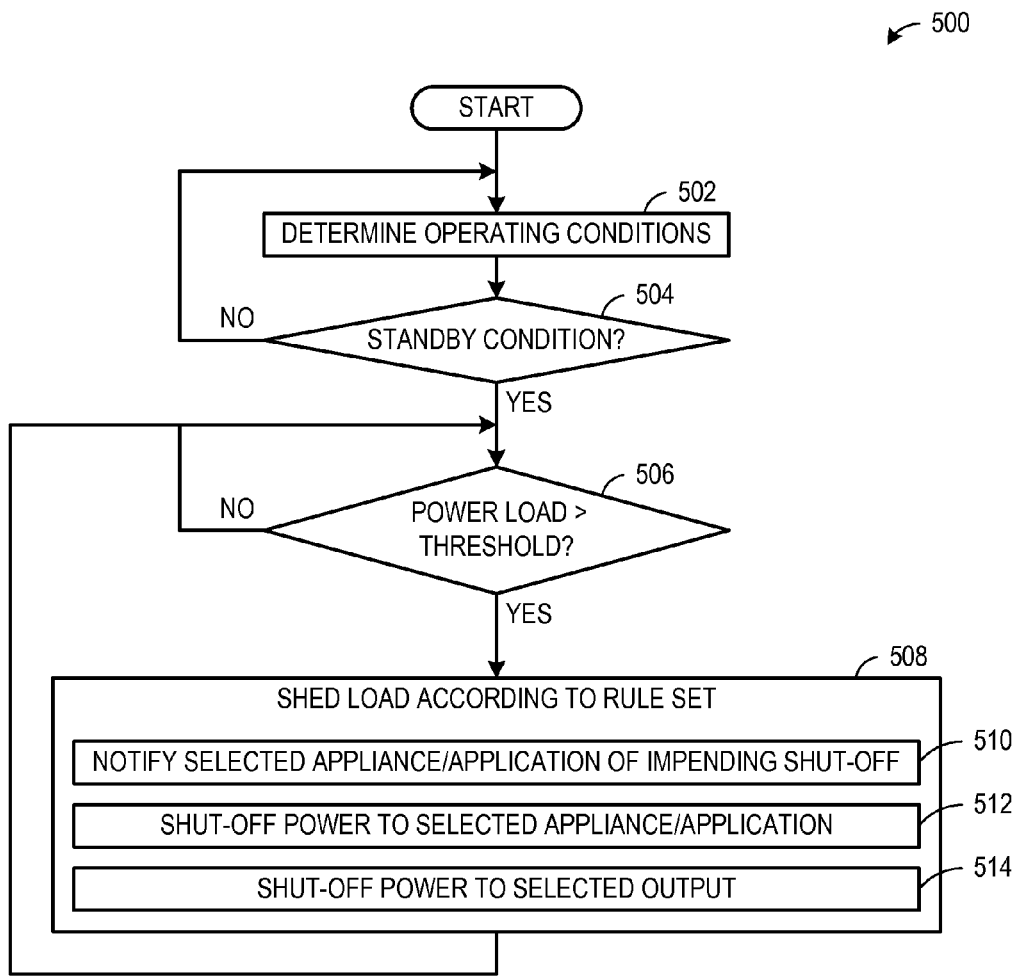
FIG. 5 shows an example embodiment of an available power based method for managing power distribution in a rail vehicle system.

FIG. 5 is a flowchart illustrating an example embodiment of a method 500 for managing power distribution in a vehicle system based on power available for consumption. In one example, the method 500 may be performed by the power management system as described above. At 502, the method may include determining operating conditions of the rail vehicle system. Determining operating conditions may include receiving information from various components of the vehicle system, such as the power source (including the engine), the battery, the AESS system, the battery saving device, and/or the plurality of applications and/or appliances. Furthermore, determining operating conditions may include monitoring various parameters of the vehicle system. The parameters monitored may include, for example, ambient temperature, engine oil temperature, power source/knife switch voltage, battery voltage, application and/or appliance voltage, a battery state of charge, engine operating parameters, if applicable elapsed time since engine off, etc.

At 504, the method may include determining if a standby condition exists for the vehicle system. As an example, the standby condition exists when the engine is turned off and electronic applications and/or appliances are running off of power from the battery and/or other devices (e.g., battery saving devices). If it is determined that the standby condition exists, the method moves to 506. Otherwise the method returns to 502.

During the standby condition, the vehicle system may be stationary and parked, and further the engine may not be running. However, on-board electronics applications and/or appliances, such as an on-board monitoring system, radio communications, or a computer control system of the vehicle are maintained active during the standby condition. These electronics applications and/or appliances create a power load that lowers the state of charge of the battery. At 506, the method may include determining if the power load of the active applications and/or appliances is greater than a threshold value. For example, the threshold value may include a predefined level of the battery state of charge (e.g., a state of charge for restarting the engine). As another example, the threshold value may include a predefined rate of dissipation of the battery state of charge. If it is determined that the power load is greater than the threshold the method moves to 508. Otherwise, the method returns to 506.

At 508, the method may include shedding power load according to a rule set. In some embodiments, the rule set may define a shutdown priority that is predefined. In some embodiments, the rule set and/or the priority may be dynamically adjusted based on operating conditions. The priority of the rule set can be defined according to customer preference. For example, the rule set may prioritize specific applications and/or appliances above other applications and/or appliances to remain on. As another example, the rule set may prioritize applications and/or appliances that with a smaller power load above applications and/or appliances with a greater power load to remain on. A suitable priority of application and/or appliance shutdown may be established in the rule set according to customer preference.

At 510, as part of shedding power load, the method may include notifying applications and/or appliances selected for shut-off of the impending shut-off. As an example, the power management system sends a class C/D message as specified in the PTC communications architecture to notify a selected application and/or appliance of impending shut-off. The notification allows the selected applications and/or appliances to shut themselves down in an orderly manner to prevent data loss and/or corruption.

In some embodiments, the power management system has the ability to shut-off power to a specific application and/or appliance, such as where the power management system includes one or more PDMPs. In such embodiments, at 512, as part of shedding power load, the method may include shutting off power to the selected application and/or appliance. In other words, the power management system performs application and/or appliance specific power shut-off.

In some embodiments, the power management system has the ability to shut-off power to an output at a specific voltage level and correspondingly to shut-off power to applications and/or appliances connected to that output. In such embodiments, at 514, as part of shedding power load, the method may include shutting off power to the selected voltage level output. In other words, the power management system performs voltage level specific power shut-off. After performing the power load shedding operation the method moves to 506 to monitor the power load to see if it becomes greater than the threshold to comply with battery dissipation criteria of the rule set.

By selectively shutting off power to applications and/or appliances connected on a battery-side of a switch during a standby condition where an engine is shut-off, power load can be shed. In this way, battery dissipation events that result in delays and increased costs can be inhibited. Further, by shedding power load according to a priority of a rule set, application and/or appliance shut-off may be performed in a directed and orderly manner that may be customizable to customer preference. Further still, by notifying applications and/or appliances of an impending shut-off, they are able to suitably shut themselves down. In this way, data loss and/or corruption can be inhibited.

Figure 6:
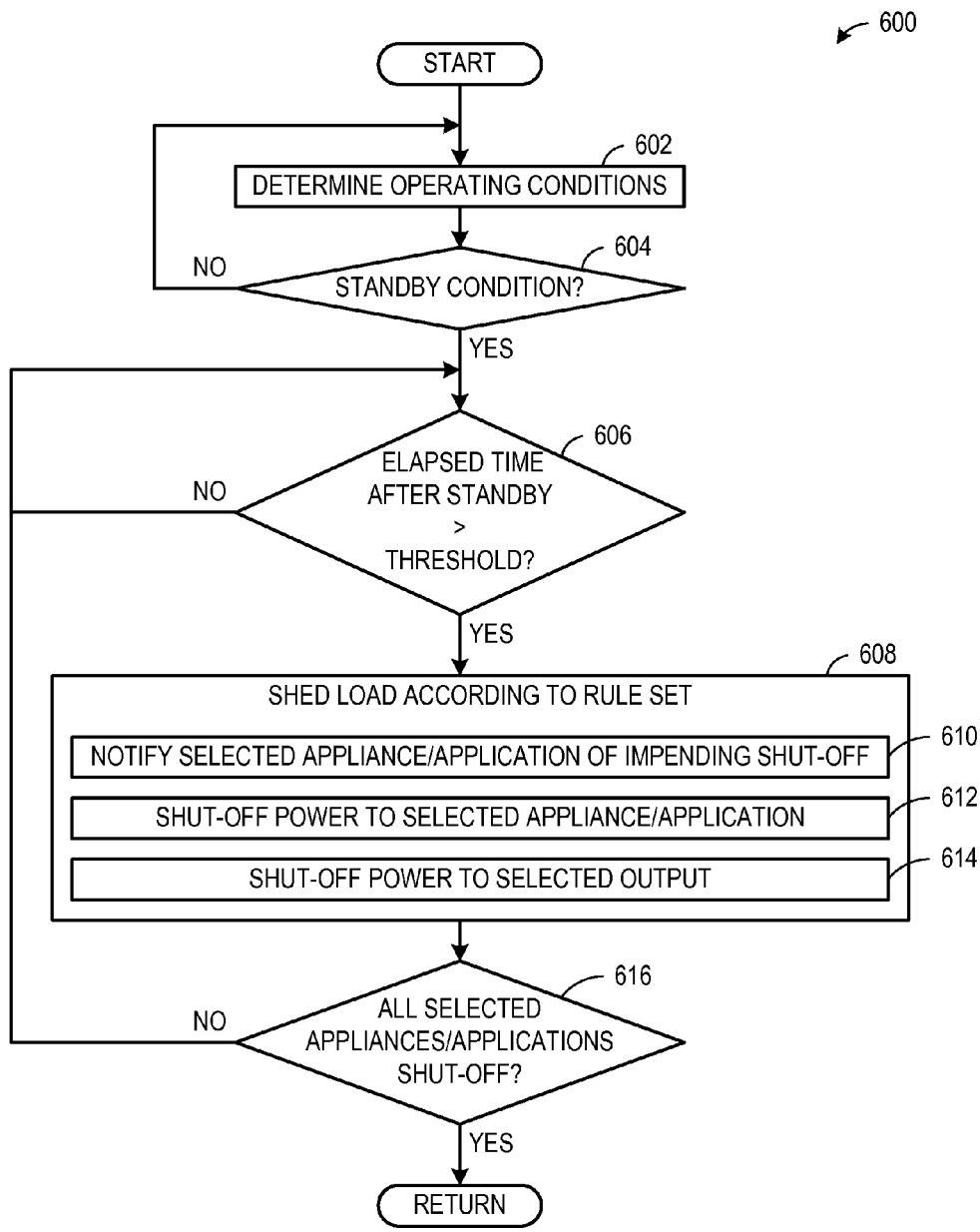
FIG. 6 shows an example embodiment of a time based method for managing power distribution in a rail vehicle system.

FIG. 6 illustrates an example embodiment of a time-based method 600 for managing power distribution in a rail vehicle system. In other words, a rule set dictates that applications and/or appliances are shut-off a specified time after engine shut-off according to a priority defined by the rule set. In one example, the method 600 may be performed by the power management system as described above. At 602, the method may include determining operating conditions of the rail vehicle system.

At 604, the method may include determining if a standby condition exists for the rail vehicle system. If it is determined that the standby condition exists, the method moves to 606. Otherwise the method returns to 602.

Power usage rates of each of the applications and/or appliances are pre-programmed into the power management system so that the rule set defines elapsed time after engine shut-off for each of the applications and/or appliances to remain on without a battery dissipation event occurring. At 606, the method may include determining if an elapsed time after the start of the standby condition (or engine shut-off) is greater than a threshold value. In some embodiments, the threshold value is a specific duration for each application and/or appliance. In some embodiments, the threshold value is specific to each of the voltage level outputs. If it is determined that the elapsed time after the start of the standby condition is greater than the threshold the method moves to 608. Otherwise, the method returns to 606.

At 608, the method may include shedding power load according to a rule set. At 610, as part of shedding power load, the method may include notifying applications and/or appliances selected for shut-off of the impending shut-off. In some embodiments, the power management system has the ability to shut-off power to a specific application and/or appliance, such as where the power management system includes one or more PDMPs. In such embodiments, at 612, as part of shedding power load, the method may include shutting off power to the selected application and/or appliance. In other words, the power management system performs application and/or appliance specific power shut-off. In some embodiments, the power management system has the ability to shut-off power to an output at a specific voltage level and correspondingly to shut-off power to applications and/or appliances connected to that output. In such embodiments, at 614, as part of shedding power load, the method may include shutting off power to the selected voltage level output. In other words, the power management system performs voltage level specific power shut-off. After shedding power load the method returns to 606 to monitor time thresholds for additional power load shedding to comply with the criteria of the rule set.

By managing distribution of power to applications and/or appliances and shedding power load according to a time based priority rule set, power load shedding can be performed in a directed and orderly manner. In this way, battery dissipation events can be inhibited.

Figure 7:
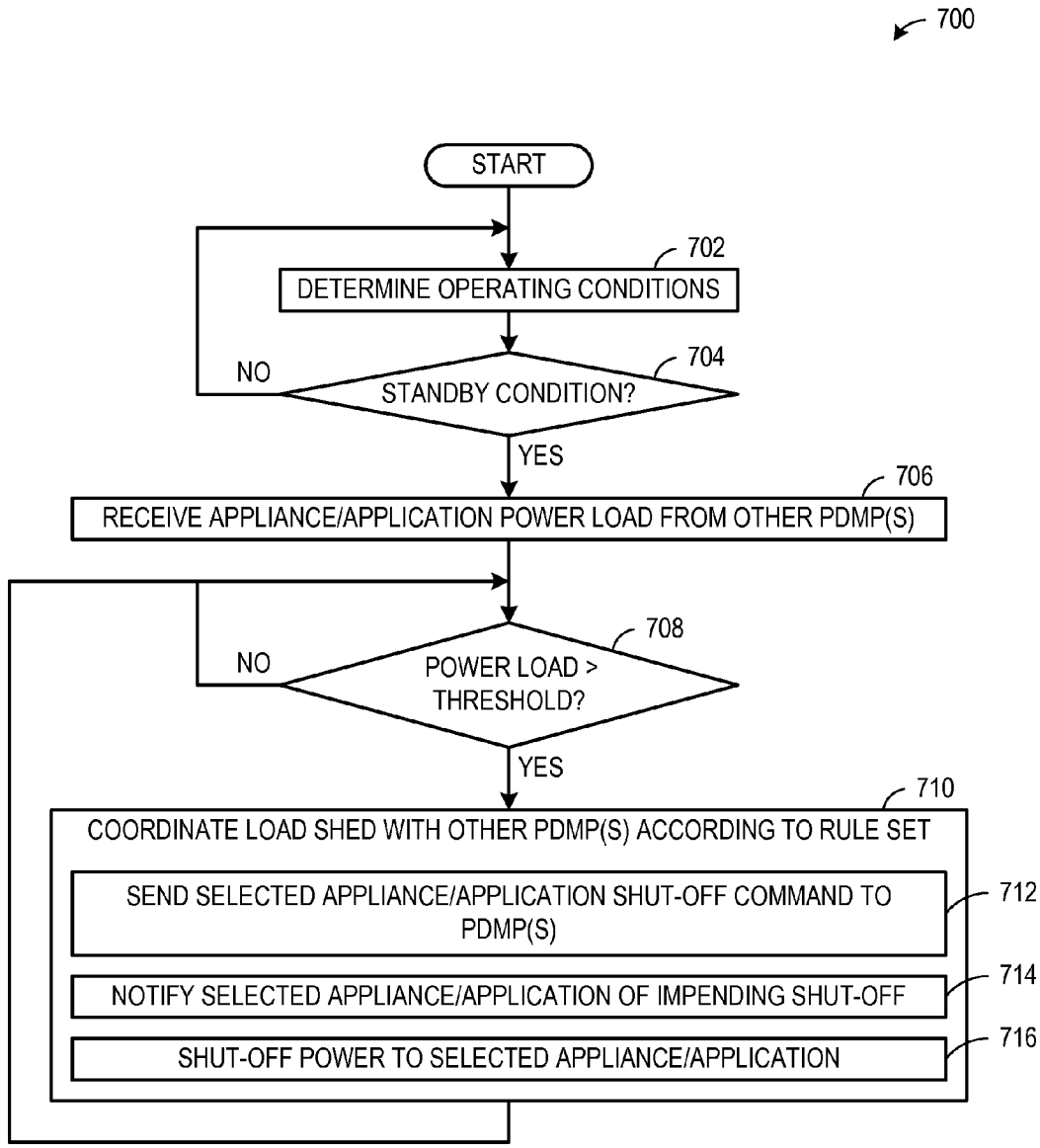
FIG. 7 shows an example embodiment of method for managing power distribution coordinated between a plurality of power distribution management panels in a rail vehicle system.

FIG. 7 illustrates an example embodiment of method 700 for managing power distribution coordinated between a plurality of power distribution management panels in a rail vehicle system. In one example, the method may be performed by the power management module, and more particularly by the first PDMP and/or the second PDMP as described above. At 702, the method may include determining operating conditions of the rail vehicle system.

At 704, the method may include determining if a standby condition exists for the rail vehicle system. If it is determined that the standby condition exists, the method moves to 706. Otherwise the method returns to 702.

At 706, the method may include receiving application and/or appliance operating state and/or power load information from other PMDP(s). The power management system may be able to determine a total or collective power load for all of the PDMPs to determine if power load shedding should be performed to inhibit battery dissipation. Further, the received information can be used to determine which active applications and/or appliances are prioritized above others to remain on.

At 708, the method may include determining if the total power load of the active applications and/or appliances connected to all of the PDMPs is greater than a threshold. If it is determined that the power load is greater than the threshold the method moves to 710. Otherwise, the method returns to 708.

At 708, the method may include shedding power load in a coordinated manner between all of the PDMPs according to a rule set. For example, different applications and/or appliances connected to different PDMPs may be shutdown based on the priority of the rule set. As another example, all applications and/or appliances connected to the first PDMP may be prioritized over all of the applications and/or appliances connected to the second PDMP to remain on. At 712, as part of shedding power load, the method may include sending application and/or appliance specific shut-off commands to the PDMPs to carry out power shut-off in a coordinated manner. At 714, as part of shedding power load, the method may include notifying applications and/or appliances selected for shut-off of the impending shut-off. At 716, as part of shedding power load, the method may include shutting off power to the selected application and/or appliance. After performing the power load shedding operation the method moves to 708 to monitor the power load to see if it becomes greater than the threshold to comply with battery dissipation criteria of the rule set.

By receiving application and/or appliance operating state and/or power usage information from other PDMPs, a total or collective power load can be determined so that accurate power load shedding can be performed. Further, by commanding shut-off of applications and/or appliances controlled by different PDMPs, power load shedding can be performed in a coordinated manner.

Figure 8:
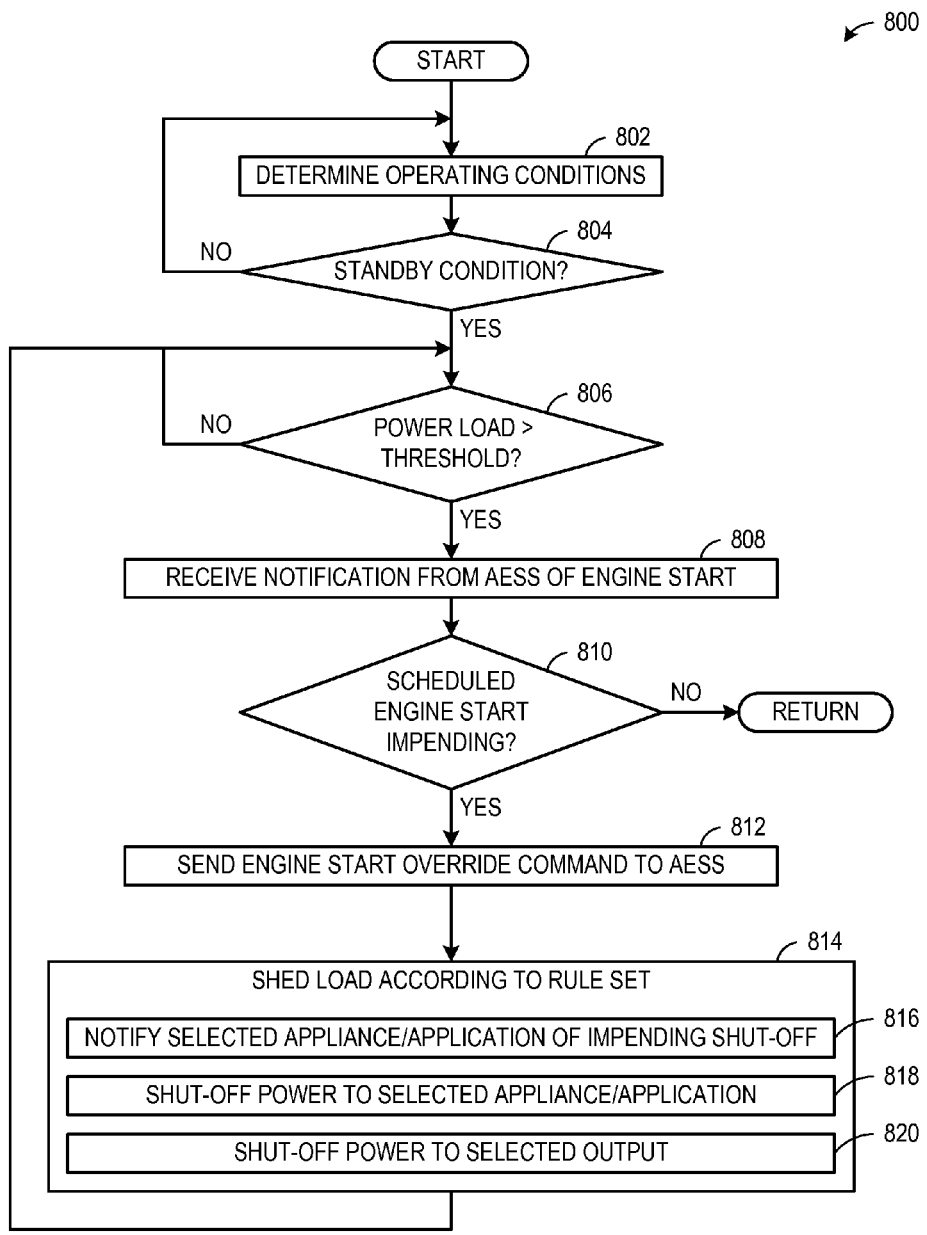
FIG. 8 shows an example embodiment of a method for managing power distribution coordinated between an automatic engine start stop (AESS) device and a power distribution management panel in a rail vehicle system.

FIG. 8 shows an example embodiment of a method for managing power distribution coordinated between an automatic engine start stop (AESS) device and a power distribution management panel in a vehicle system. In one example, the method may be performed by the power management system as described above. At 802, the method may include determining operating conditions of the rail vehicle system.

At 804, the method may include determining if a standby condition exists for the vehicle system. If it is determined that the standby condition exists, the method moves to 806. Otherwise the method returns to 802.

At 806, the method may include determining if the total power load of the active applications and/or appliances is greater than a threshold value. If it is determined that the power load is greater than the threshold value the method moves to 808. Otherwise, the method returns to 806.

At 808, the method may include receiving notification of an impending AESS commanded engine start. As discussed above, the AESS system may command an engine start to provide power to increase the state of charge of the battery to a suitable level that complies with the AESS criteria.

At 810, the method may include determining if a scheduled engine start is impending. An engine start may be scheduled for variety of reasons. For example, to warm up the locomotive or other vehicle prior to leaving the station. As another example, an engine start may be scheduled to perform routine service or maintenance. The power management system may receive information from a connected application and/or appliance (e.g., TMC) of an engine start schedule through the communication line to determine if a scheduled engine start is impending. If it is determined that a scheduled engine start is impending the method moves to 812. Otherwise, the method returns to other operations.

At 812, the method may include sending an engine start override command to the AESS system. The override command cancels the AESS commanded engine start. Since a scheduled engine start may be impending, the premature AESS commanded engine start may be cancelled in favor of power load shedding to inhibit battery dissipation until the scheduled engine start.

At 814, the method may include shedding power load according to a priority of a rule set. At 816, as part of shedding power load, the method may include notifying applications and/or appliances selected for shut-off of the impending shut-off. In some embodiments, the power management system has the ability to shut-off power to a specific application and/or appliance, such as where the power management system includes one or more PDMPs. In such embodiments, at 818, as part of shedding power load, the method may include shutting off power to the selected application and/or appliance. In other words, the power management system performs application and/or appliance specific power shut-off. In some embodiments, the power management system has the ability to shut-off power to an output at a specific voltage level and correspondingly to shut-off power to applications and/or appliances connected to that output. In such embodiments, at 820, as part of shedding power load, the method may include shutting off power to the selected voltage level output. In other words, the power management system performs voltage level specific power shut-off. After performing the power load shedding operation the method moves to 806 to monitor the power load to see if it becomes greater than the threshold to comply with battery dissipation criteria of the rule set.

By coordinating load shedding operations with the AESS system, premature engine starting can be inhibited. In this way, fuel may be preserved and emissions may be reduced.

Note the power management system coordinates load shedding with any suitable integrated system/device of the rail vehicle system. For example, the power management system communicates and coordinates with a vehicle computing system and other devices that perform similar power management functions that are integrated into the vehicle system. Further, the power management system can override operations of such a system/device to perform power load shedding.

Figure 9:
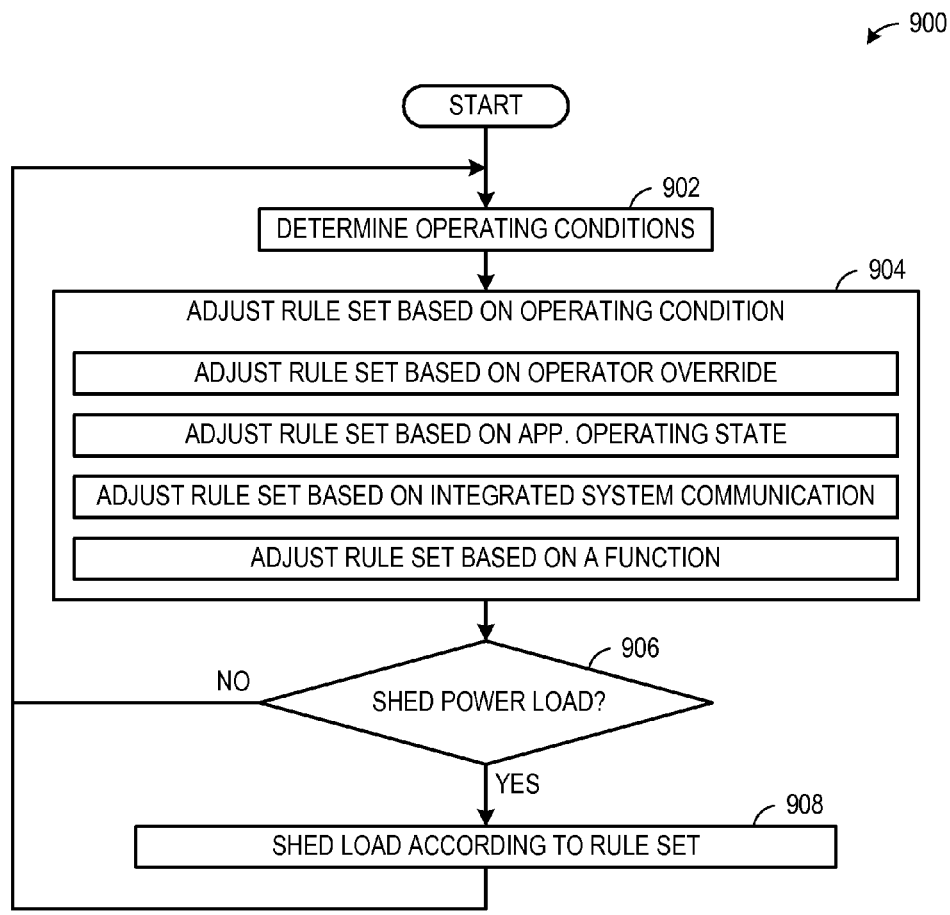
FIG. 9 shows an example embodiment of a method for managing power distribution according to a dynamically adjustable rule set in a rail vehicle system.

FIG. 9 shows an example embodiment of a method for managing power distribution according to a dynamically adjustable rule set in a vehicle system. In one example, the method 900 may be performed by the power management as described above. At 902, the method may include determining operating conditions of the rail vehicle system.

At 904, the method may include adjusting the rule set based on an operating condition. For example, the method may include adjusting the rule set based on receiving an operator commanded override. The override may dictate an application and/or appliances remain on, such as for performing maintenance and/or service on the application and/or appliance. As another example, the method may include adjusting the rule set based on an operating state of a specific application and/or appliance. In one particular example, a router may remain on if it is determined that it has to transmit data and the rule set is adjusted to sequence other applications and/or appliances for shut-off while the router is transmitting data. As yet another example, the method may include adjusting the rule set based on communication/coordination with integrated systems/devices of the rail vehicle system. In one particular example, power management is coordinated among a neutral network of integrated devices and the rule set is adjusted based on a command received from a node device of the neural network. As yet another example, the method may include adjusting the rule set based on a mathematical function. In one particular example, the rule set is adjusted by time variant and time dependent Taylor series rules with at least one variable and/or parameter set. In some embodiments, the rule set may adjusted based on more than one operating condition.

At 904, the method may include determining if power load generated by applications and/or appliances on a battery is to be shed. As discussed above, shedding power load can be performed based on the rule set which varies as operating conditions change. If it is determined that power load is to be shed the method moves to 908. Otherwise the method returns to 902.

At 908, the method may include shedding power load according to the resultant rule set that is adjusted based on the determined operating conditions.

By adjusting the rule set dynamically based on operating conditions, application and/or appliance shutdown and/or priority of application and/or appliance shutdown can be adjusted to accommodate variations in operating conditions. In this way, applications and/or appliances may remain on under certain conditions to provide desired functionality.

Figure 10:
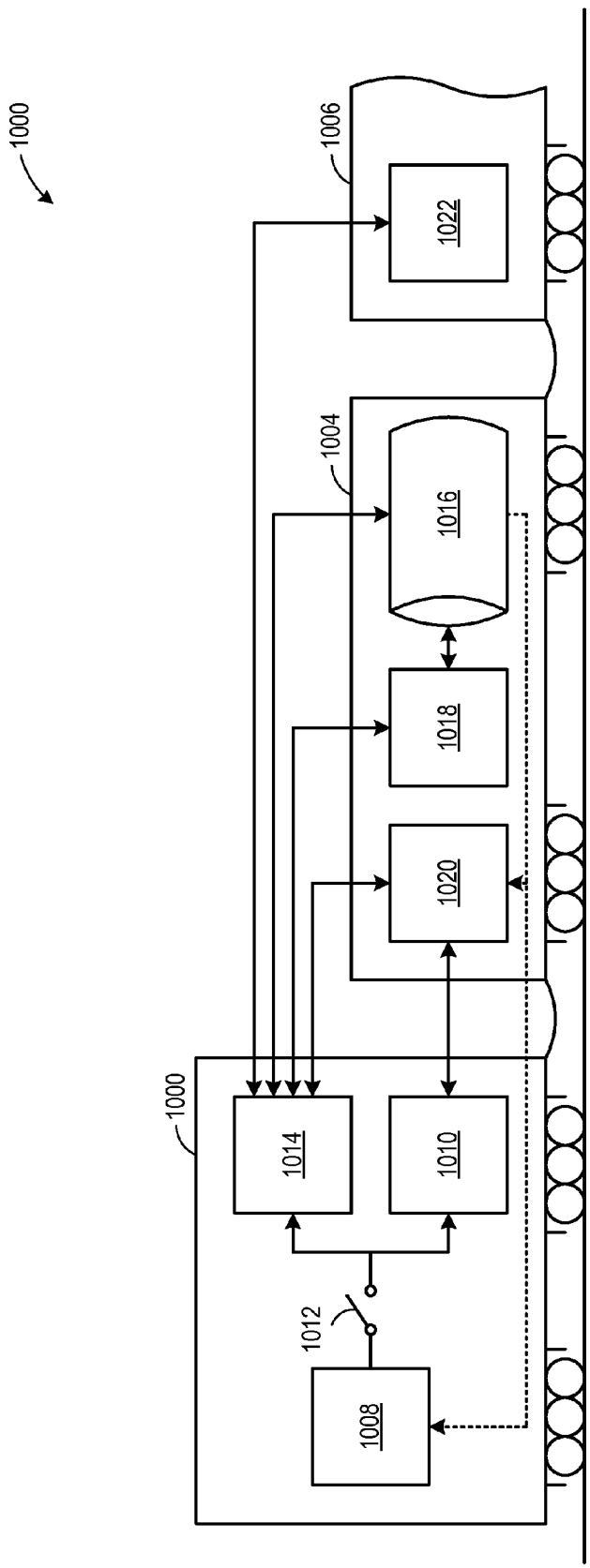
FIG. 10 schematically shows an example embodiment of a vehicle system including a plurality of vehicles.

FIG. 10 is a block diagram of an example embodiment of a vehicle system 1000. The vehicle system includes a plurality of vehicles that are coupled together including a first vehicle 1002, a second vehicle 1004, and third vehicle 1006. The vehicle system may include a suitable number of vehicles that are couplable to each other.

The first vehicle includes a power source 1008 configured to provide power to a variety of downstream components of the vehicle system. The power source may include an internal combustion engine and an alternator. In particular, the engine is operable to generate torque that may be transmitted to the alternator to generate electricity for subsequent propagation to various loads of the vehicle system. For example, the internal combustion engine may be at least partially fueled by natural gas (e.g., liquid natural gas ((LNG)). However, in some embodiments of the vehicle system, alternate fuels may be employed, such as diesel, gasoline, biodiesel, ethanol, compressed natural gas, a combination thereof, or a hybrid electric combination thereof.

A battery 1010 is connected downstream of the power source. A switch 1012 is connected in-line between the power source and the battery. The switch is configured to connect/disconnect the power source to/from the battery. During engine operation, the switch is placed in a state where power is provided to the battery from the power source. Furthermore, as discussed above, the vehicle system may be placed in a standby condition where the engine may be shut-off. During the standby condition, the switch may be placed in a state where the power source is disconnected from the battery in order to prevent undesired engine starting.

The first vehicle includes a power management system 1014 configured to manage selective distribution of power to a plurality of electronic applications or appliances distributed throughout the plurality of vehicles. The power management system may be connected on either side of the switch. In the illustrated embodiment, the power management system is connected downstream from the switch. In other words, the switch is connected between the power source and the power management system.

During a condition where the engine is operating, when the switch is in a state where the power source is connected to the battery, the power management system is configured to manage distribution of power provided by the power source to a plurality of electronic applications or appliances distributed throughout the vehicle system based on a rule set that determines an order in which operation of the plurality of electronic applications or appliances is modified. During the standby condition, when the switch is in a state where the power source is disconnected from the battery, the power management system is configured to shed power load on the battery in response to a power load of the plurality of electronic applications or appliances being greater than a first threshold value defined by the rule set.

In one example, the power management system, during the standby condition, is configured to shut off power to one or more of the plurality of electronic applications or appliances in response to an elapsed time after start of the standby condition being greater than a second threshold defined by the rule set. In another example, the power management system, during the standby condition, is configured to shut off power to one or more of the plurality of electronic applications or appliances in response to receipt of a signal generated by the electronic applications or appliances. For example, the signal may be generated by an electronic application or appliance in response to completing an operation (e.g., sending a data transmission, shutting down, etc.).

Further, the power management system may be configured to change an order in which operation of the plurality of electronic applications or appliances is modified based on an operating condition. In some embodiments, the rule set order includes a hierarchy by which the electronic applications or appliances are turned off. In one example, at least two of the plurality of electronic applications or appliances have different voltages, and the order may be based at least in part on the voltages of the at least two of the plurality of electronic applications or appliances. In another example, the order may be based at least in part on ambient weather conditions.

In some embodiments, the plurality of electronic applications or appliances may include operation-essential electronic devices and the power management system may be configured to selectively power the operation-essential electronic devices in priority over other devices and irrespective of the threshold value for as long as the battery is capable of powering such operation-essential electronic devices.

The second vehicle includes a fuel storage system 1016. In one example, the fuel storage system stores LNG that is supplied to the engine of the power source for combustion. In such a configuration, the second vehicle may be referred to as a "tender" car that is connected with a locomotive on which the engine is disposed. It is to be understood that the fuel storage system may store a suitable fuel for combustion in the engine of the power source.

A cryogenic system 1018 may be configured to thermally manage fuel in the fuel storage system. For example, the cryogenic system may circulate refrigerant through the fuel storage system to cool the LNG in order to maintain the natural gas in liquid form. In one example, the cryogenic system may be configured to maintain the LNG at its boiling point for the designated atmospheric pressure.

The power management system may be configured to manage power distribution to the fuel storage system and the cryogenic system. In one example, during the standby condition, the power management system may adjust the order in which electronic applications or appliances are turned off based on ambient temperature or pressure in order to maintain operation of the cryogenic system to thermally manage the LNG in the fuel storage system. For example, the cryogenic system may be turned-off after other electronic applications at higher temperatures relative to at lower temperatures.

In some embodiments, the second vehicle includes an auxiliary power unit (APU) 1020 that may be operable to supply power to the battery. Further, in some embodiments, the APU supplies power to a hotel load 1022 created by a plurality of the electronic applications or appliances via the power management system. In some embodiments, the APU supplies power to both the battery and the hotel load. In one example, the APU includes an internal combustion engine. In some embodiments, the APU is fueled by a portion of fuel from the fuel storage system. Further, the APU may be configured to supply power to a fuel management system/the fuel storage system. The APU may be operated during the standby condition to extend operation of the plurality of electronic applications and appliances while the power source is disconnected from the battery.

In some embodiments, an automatic engine start stop system may be coupled to the power management system, and configured to respond to a signal by putting an engine of the vehicle in a standby condition or by initiating a start of the engine.

The third vehicle includes the hotel load that receives power from the power management system. For example, the hotel load may include heating and air conditioning, lighting, and appliances such as refrigerators, coffee makers and microwave ovens as well as television and entertainment systems. In one particular example, the third vehicle may be a passenger car that may be equipped with various electronic appliances that makeup the hotel load. In another example, the third vehicle may be a freight car that may be equipped with heating, ventilation, and air conditioning appliances. In another example, the third vehicle may be an electronic multiple unit (EMU) vehicle that may be self-propelled, and the load may include vehicle EMU hardware that provides communications to "wake up" other systems on the EMU vehicle upon transitioning from the standby condition to the operating condition. In this example, the hierarchy of the shutdown order of the plurality of electronic applications and appliances may dictate that the EMU hardware be turned off last or later than most other electronic applications or appliances, so that such communications may be sent.

The EMU hardware may be merely one example of a node device in a network of integrated devices. Further, this concept may be broadly applicable to a various devices. For example, an operating condition on which the power management system may be configured to change an order in which operation of the plurality of electronic applications or appliances is modified may include receiving a command from a node device in a network of integrated devices to remain powered-on in order to provide communications to activate other integrated devices of the network. In another example, the operating condition on which the power management system may be configured to change an order in which operation of the plurality of electronic applications or appliances is modified may include receiving a command from a node device in a network of integrated devices to remain powered-on in order to provide collision avoidance functionality for the vehicle.

Figure 11:
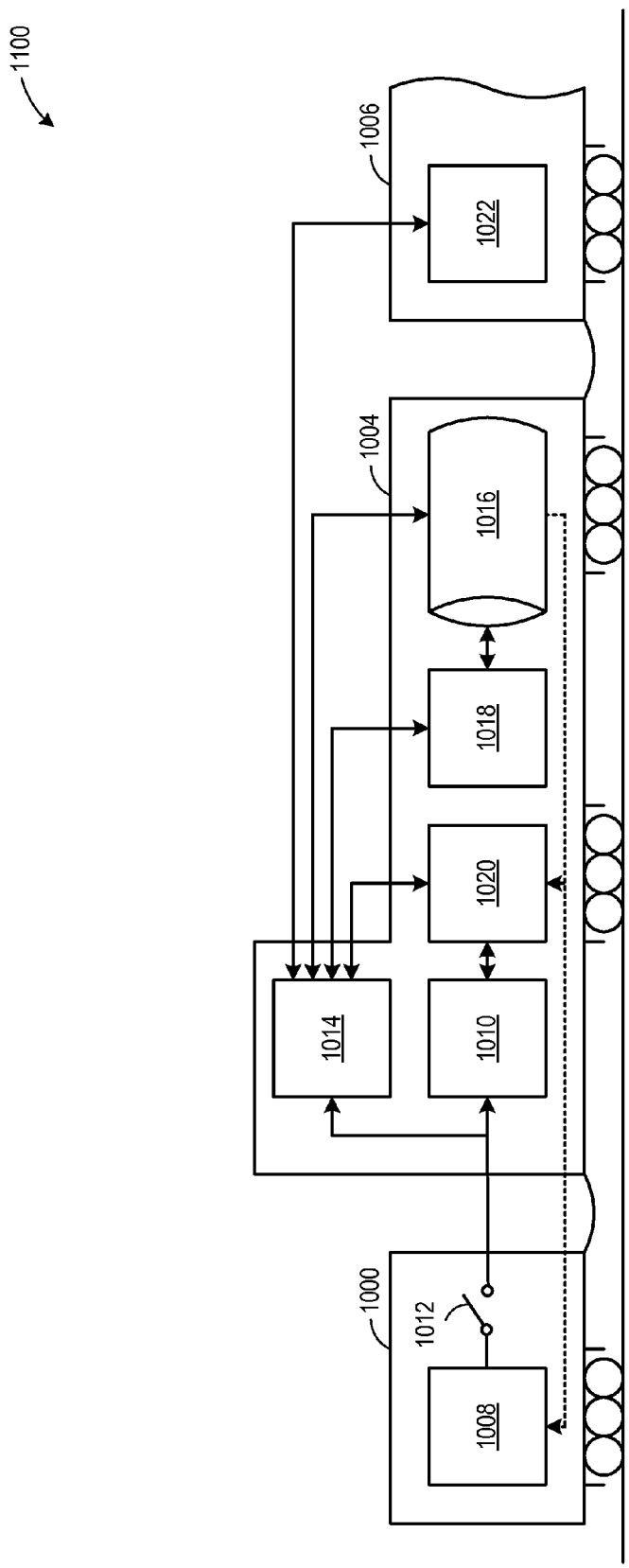
FIG. 11 schematically shows another embodiment of a vehicle system including a plurality of vehicles.

FIG. 11 is a block diagram of another embodiment of a vehicle system 1100. Components of the vehicle system 1100 that may be substantially the same as those of the vehicle system 1000 are identified in the same way and are described no further. However, it will be noted that components identified in the same way in different embodiments of the present disclosure may be at least partly different.

In the illustrated embodiment, the power source is disposed on the first vehicle and the battery and the power management system are disposed on the second vehicle that is couplable with the first vehicle. In particular, the power management system and the battery are connected downstream of the switch. When the switch is placed in a state where the battery may be disconnected from the power source, the power management system may be configured to particularly manage power for the electronic applications and appliances of the second vehicle (e.g., the tender car). For example, the power management system may be configured to manage power to the cryogenic system in order to thermally manage fuel of the fuel storage system. Furthermore, the power management system may be configured to manage operation of the APU to provide power to the battery. In some embodiments, the power management system may be configured to control fuel flow from the fuel storage system to the APU when active fuel control from the power source may be shut down.

In some embodiments, the power management system may be configured to mange power to the hotel load of the third vehicle (or a hotel load distributed throughout a plurality of additional vehicles) when the power management system is disposed on the second vehicle.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A power management system, connectable on either side of a switch, for managing selective distribution of power to a plurality of electronic applications or appliances based on a rule set that determines an order in which operation of the plurality of electronic applications or appliances is modified, the power management system being configured to:
   during a standby condition in which the switch is in a state that disconnects a battery from a power source, shed power load on the battery in response to a power load of the plurality of electronic applications or appliances being greater than a first threshold value defined by the rule set, and
   change an order in which operation of the plurality of electronic applications or appliances is modified based on an operating condition.

2. The system of claim 1, wherein the plurality of electronic applications or appliances comprises a cryogenic system that is configured to manage fuel in a fuel storage system.

3. The system of claim 2, wherein the power management system is disposed on a first vehicle, and the cryogenic system is disposed on a second vehicle that is couplable with the first vehicle.

4. The system of claim 1, wherein the power source is an auxiliary power unit (APU) that is operable to supply power to the battery, a hotel load created by the plurality of electronic applications or appliances, or both the battery and the hotel load.

5. The system of claim 4, wherein the power management system is disposed on a first vehicle, and a cryogenic system that is configured to manage fuel in a fuel storage system is disposed on a second vehicle that is couplable with the first vehicle, and the APU is disposed on the second vehicle.

6. The system of claim 5, wherein the APU is fueled by a portion of fuel from the fuel storage system.

7. The system of claim 1, wherein the power management system, during the standby condition, is configured to shut off power to one or more of the plurality of electronic applications or appliances in response to an elapsed time after start of the standby condition being greater than a second threshold value defined by the rule set.

8. The system of claim 1, wherein the power management system, during the standby condition, is configured to shut off power to one or more of the plurality of electronic applications or appliances in response to receipt of a signal generated by the electronic applications or appliances.

9. The system of claim 1, wherein the rule set order includes a hierarchy by which the electronic applications or appliances are turned off.

10. The system of claim 9, wherein at least two of the plurality of electronic applications or appliances have different voltages, and the order is based at least in part on the voltages of the at least two of the plurality of electronic applications or appliances.

11. The system of claim 9, wherein the order is based at least in part on ambient weather conditions.

12. The system of claim 1, further comprising an automatic engine start stop system coupled to the power management system, and configured to respond to a signal by putting an engine of the vehicle in a standby condition or by initiating a start of the engine.

13. The system of claim 1, wherein the plurality of electronic applications or appliances include operation-essential electronic devices and the power management system is configured to selectively power the operation-essential electronic devices in priority over other devices and irrespective of the threshold value for as long as the battery is capable of powering such operation-essential electronic devices.

14. A vehicle system, comprising:
   a power management system for managing selective distribution of power, provided from a power source disposed on a first vehicle, to a plurality of electronic applications or appliances based on a rule set that determines an order in which operation of the plurality of electronic applications or appliances is modified, the power management system being configured to:
      during a standby condition in which a battery is disconnected from the power source, shed power load on the battery from the plurality of electronic applications or appliances as defined by the rule set, and change an order in which operation of the plurality of electronic applications or appliances is modified based on an operating condition.

15. The system of claim 14, wherein the power management system is disposed on the first vehicle, and the plurality of electronic applications or appliances comprises a cryogenic system that is configured to manage fuel in a fuel storage system disposed on a second vehicle that is couplable with the first vehicle.

16. The system of claim 15, further comprising an auxiliary power unit (APU) disposed on the second vehicle that is operable to supply power to the battery, a hotel load created by the plurality of electronic applications or appliances, or both the battery and the hotel load.

17. The system of claim 16, wherein the fuel storage system is configured to provide fuel to the APU, and the APU is further operable to supply power to a fuel management system.

18. The system of claim 14, wherein the operating condition includes receiving a command from a node device in a network of integrated devices to remain powered-on in order to provide communications to activate other integrated devices of the network.

19. The system of claim 14, wherein the operating condition includes receiving a command from a node device in a network of integrated devices to remain powered-on in order to provide collision avoidance functionality for the vehicle.

20. A vehicle system, comprising:
a power source disposed on a first vehicle;
a power management system for managing selective distribution of power to a plurality of electronic applications or appliances based on a rule set that determines an order in which operation of the plurality of electronic applications or appliances is modified, the power management system being configured to:
during a standby condition in which a battery disposed on a second vehicle couplable to the first vehicle is disconnected from the power source, shed power load on the battery in response to a power load of the plurality of electronic applications or appliances being greater than a threshold value defined by the rule set, and
change an order in which operation of the plurality of electronic applications or appliances is modified based on an operating condition.

* * * * *